US008353430B2

(12) United States Patent
Hilarides

(10) Patent No.: US 8,353,430 B2
(45) **Date of Patent: *Jan. 15, 2013**

(54) PRESSURIZED DISPENSABLE CONTAINER OPERABLE IN ANY ORIENTATION

(75) Inventor: Jim J. Hilarides, Racine, WI (US)

(73) Assignee: Diversey, Inc., Sturtevant, WI (US)

( * ) Notice: Subject to any disclaimer, the term of this patent is extended or adjusted under 35 U.S.C. 154(b) by 407 days.

This patent is subject to a terminal disclaimer.

(21) Appl. No.: 12/665,314

(22) PCT Filed: Jun. 24, 2008

(86) PCT No.: PCT/US2008/068027

§ 371 (c)(1), (2), (4) Date: Dec. 17, 2009

(87) PCT Pub. No.: WO2009/006108

PCT Pub. Date: Jan. 8, 2009

(65) Prior Publication Data

US 2010/0181345 A1 Jul. 22, 2010

Related U.S. Application Data

(60) Provisional application No. 60/947,073, filed on Jun. 29, 2007.

(51) Int. Cl.
*G01F 11/00* (2006.01)

(52) U.S. Cl. .................. 222/400.8; 222/386.5; 222/401

(58) Field of Classification Search .............. 169/71–73; 184/39; 222/383.1, 385, 386, 386.5, 387, 222/389, 394, 400.8, 401; 604/141–143, 604/145–147

See application file for complete search history.

(56) References Cited

U.S. PATENT DOCUMENTS

| | | | | |
|---|---|---|---|---|
| 2,053,282 | A | 9/1936 | Gewalt | |
| 2,105,160 | A * | 1/1938 | Piqueres | 222/386.5 |
| 2,823,953 | A * | 2/1958 | McGeorge | 222/320 |
| 3,023,969 | A | 3/1962 | Hudson et al. | |
| 3,207,387 | A | 9/1965 | Brickman | |
| 3,300,102 | A * | 1/1967 | Budzich | 222/386.5 |
| 3,457,016 | A | 7/1969 | Gotberg | |
| 3,938,708 | A | 2/1976 | Burger | |
| 5,108,007 | A | 4/1992 | Smith et al. | |
| 5,398,852 | A * | 3/1995 | Lacy | 222/386.5 |
| 5,499,750 | A | 3/1996 | Manifold | |
| 5,607,082 | A * | 3/1997 | Cracauer | 222/95 |
| 6,595,392 | B2 | 7/2003 | Barnett | |
| 8,104,647 | B2 * | 1/2012 | Bober et al. | 222/386.5 |
| 2003/0098315 | A1 | 5/2003 | Lacy | |

FOREIGN PATENT DOCUMENTS

| | | |
|---|---|---|
| EP | 1180343 | 2/2002 |
| GB | 2172934 | 10/1986 |
| WO | 2008005841 | 1/2008 |

OTHER PUBLICATIONS

Supplementary Partial European Search Report prepared by the European Patent Office, date of completion May 23, 2011.

International Search Report prepared by the Korean Intellectual Property Office.

* cited by examiner

*Primary Examiner* — Kevin P Shaver
*Assistant Examiner* — Patrick M Buechner
(74) *Attorney, Agent, or Firm* — Michael Best & Friedrich LLP

(57) ABSTRACT

An improved container and closure. Some embodiments are directed toward a pressurized container adapted to be utilized in any orientation. In one particular embodiment, a bladder separates a dispensable fluid in the container from a pressurizing fluid. Movement of the bladder via force from the pressuring fluid keeping the dispensable fluid in fluid communication with an outlet of the container regardless of orientation of the container. Some embodiments provide an improved sealing arrangement for a pressurized container and closure, wherein a bladder is utilized as a seal between the container and the closure.

8 Claims, 7 Drawing Sheets

PRESSURIZED DISPENSABLE CONTAINER OPERABLE IN ANY ORIENTATION

BACKGROUND OF THE INVENTION

Some mops or similar floor treating implements have used a pressurized container for the delivery of a cleaning solution, floor coating, or other floor treatment for years. For example, U.S. Pat. Nos. 3,457,016 and 2,053,282, and European Patent No. 1,180,343 show such a device.

Pressurized containers, such as the one referenced above, generally cannot operate in all orientations. For example, due to the configuration of the container which has a vent located at the top of the container (in a normal orientation) and a valve for dispensing at the bottom of the container (again in a normal orientation), this conventional container cannot dispense in an inverted orientation. Specifically, in the inverted orientation, the fluid to dispense would be located adjacent the vent and the pressurized air (or other pressurizing fluid) would be located adjacent the dispensing valve. Thus, actuation to dispense the dispensable fluid through the valve would only release the pressurized air.

Accordingly, there is a need for a pressurized container that can dispense fluid, such as a cleaning solution, in an all orientations.

SUMMARY OF THE INVENTION

The present invention relates to the field of pressurized containers for the delivery of a cleaning, coating, or other treating solution. More particularly, the invention has particular utility for use on mops utilizing a pressurized source of solution for mopping operations.

Some embodiments of the present invention provide an improved pressurizable container and closure.

Other embodiments are directed an improved closure utilizing a bladder as a sealing member.

Some embodiments are directed to a sealing arrangement for a pressurized container and closure, wherein a bladder operates as a sealing member between the closure and the container.

Some embodiments are directed toward a pressurized container having a bladder separating the dispensable fluid and the pressurization fluid; thus, allowing the pressurized container to dispense in all orientations.

Further aspects of the present invention, together with the organization and operation thereof, will become apparent from the following detailed description of the invention when taken in conjunction with the accompanying drawings.

DETAILED DESCRIPTION

Figure 1:
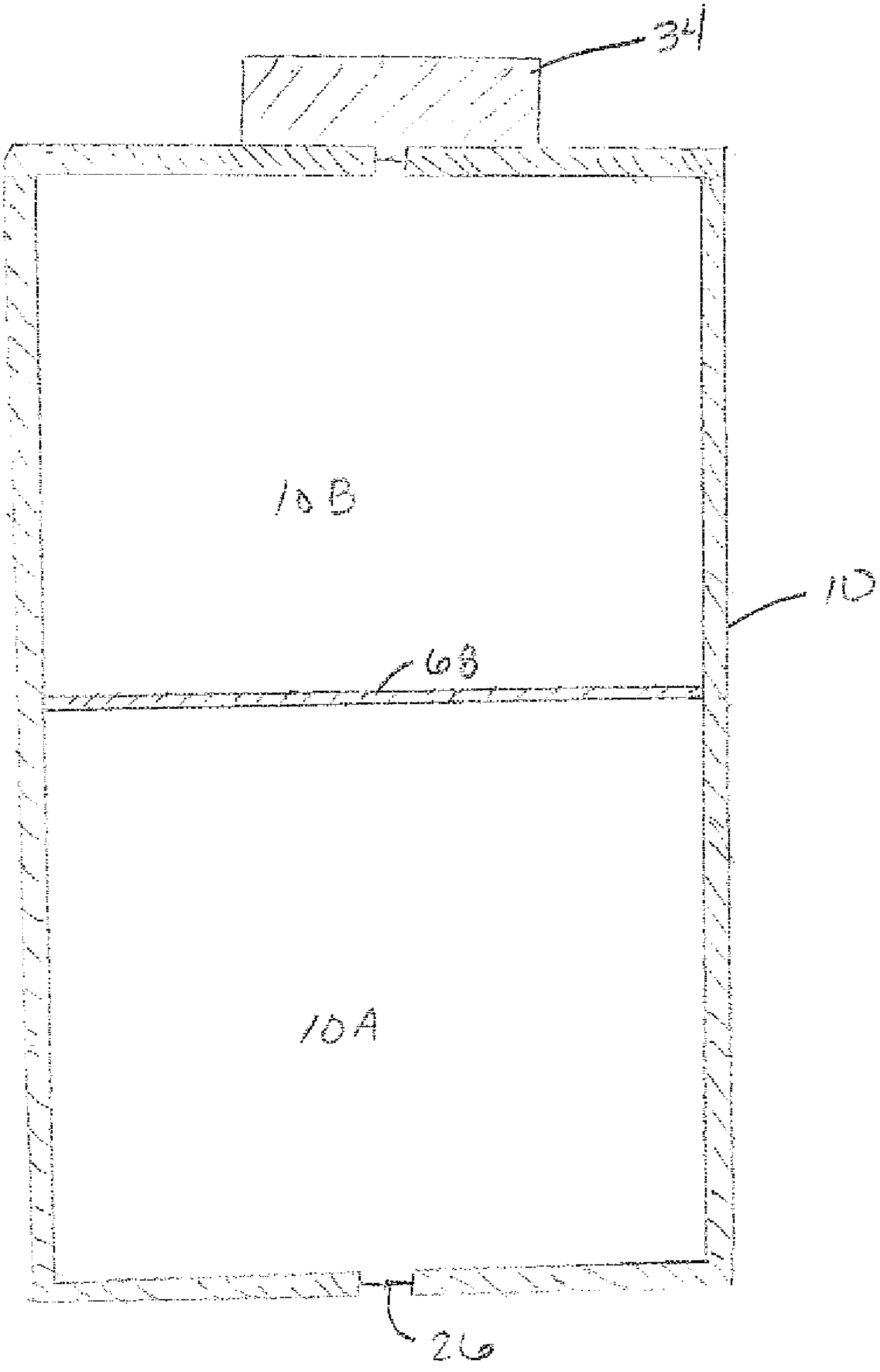
FIG. 1 is a schematic cross-sectional view of a dispensing assembly embodying aspects of the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Finally, as described in subsequent paragraphs, the specific mechanical configurations illustrated in the drawings are intended to exemplify embodiments of the invention. Accordingly, other alternative mechanical configurations are possible, and fall within the spirit and scope of the present invention.

The present invention relates to a pressurized container or dispensing assembly that can be utilized in any orientation to dispense the fluid contents stored within the container. In general, with reference to schematic FIG. 1, the container 10 has a first portion 10A adapted to house a dispensable liquid and a second portion 10B to house a pressurizing fluid. An elastic bladder 68 is coupled to the container 10 and separates the first portion 10A from the second portion 10B. A valve 26 is coupled to the container and in fluid communication with the first portion 10A. The valve 26 is selectively actuatable to dispense fluid from the press container under pressure. In some embodiments, the valve 26 can also be utilized to refill the first portion 10A with dispensable fluid. However, in some embodiments, such as the embodiment illustrated FIGS. 2-6, a separate closure 12 can be provided for this same purpose. The dispensing assembly also includes a pressurizing source 34 coupled to the container 10 and adapted to provide pressurizing fluid to the second portion 10B of the container.

Below, specific examples of the container, closure, bladder, and pressurizing source are provided. These descriptions are merely exemplary. For example, the container can be configured many different ways. Like the container, the closure utilized, if any, can be configured many different ways. Thus, it is not necessary to use the configuration of the container or closure shown herein. Rather, in some embodiments, a conventional container and/or closure, such as one shown in EP 1,180,343 can also be used. Additionally, the pressurizing source can include many different pressurizing sources. For example, in some embodiments, the pressurizing source is a manual hand pump as illustrated. However, in other embodiments, electrical pumps, compressors, and the like can be used. Additionally, canisters of pre-pressurized gas can also be used as well as chemical reactions to generate pressure. These and other pressuring means can be utilized to provide pressurized fluid, such as a gas, to the closed container.

Figure 3:
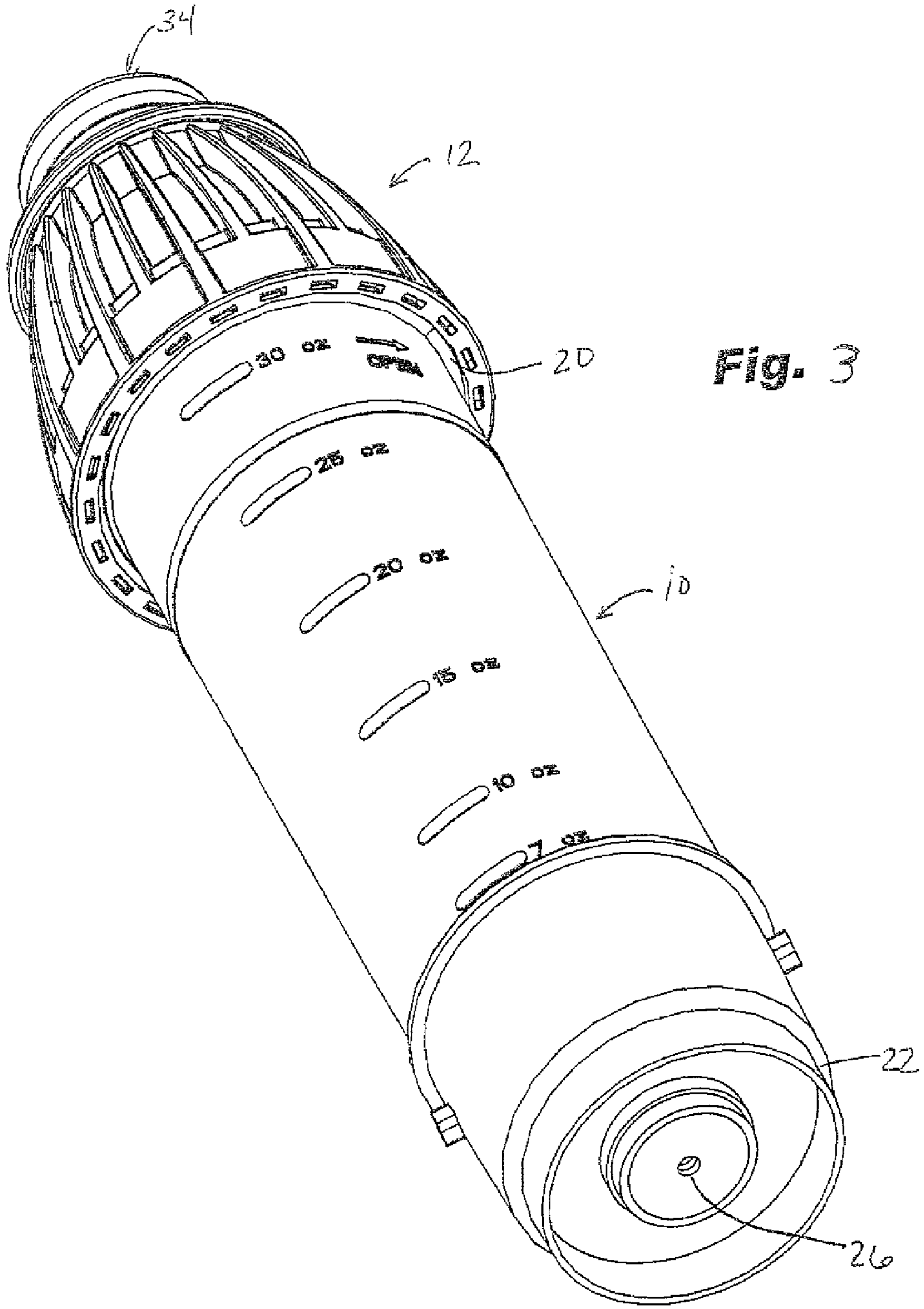
FIG. 3 is a bottom perspective view of the container and closure shown in FIG. 2.
Figure 4:
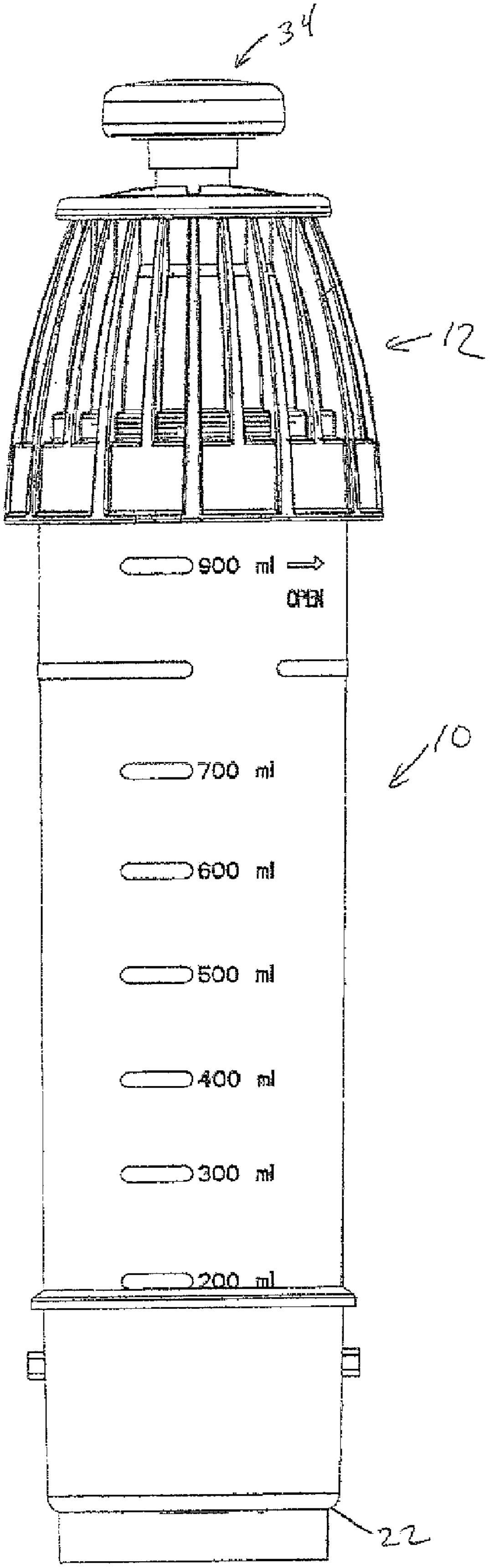
FIG. 4 is a side view of the container and closure shown in FIG. 2.
Figure 5:
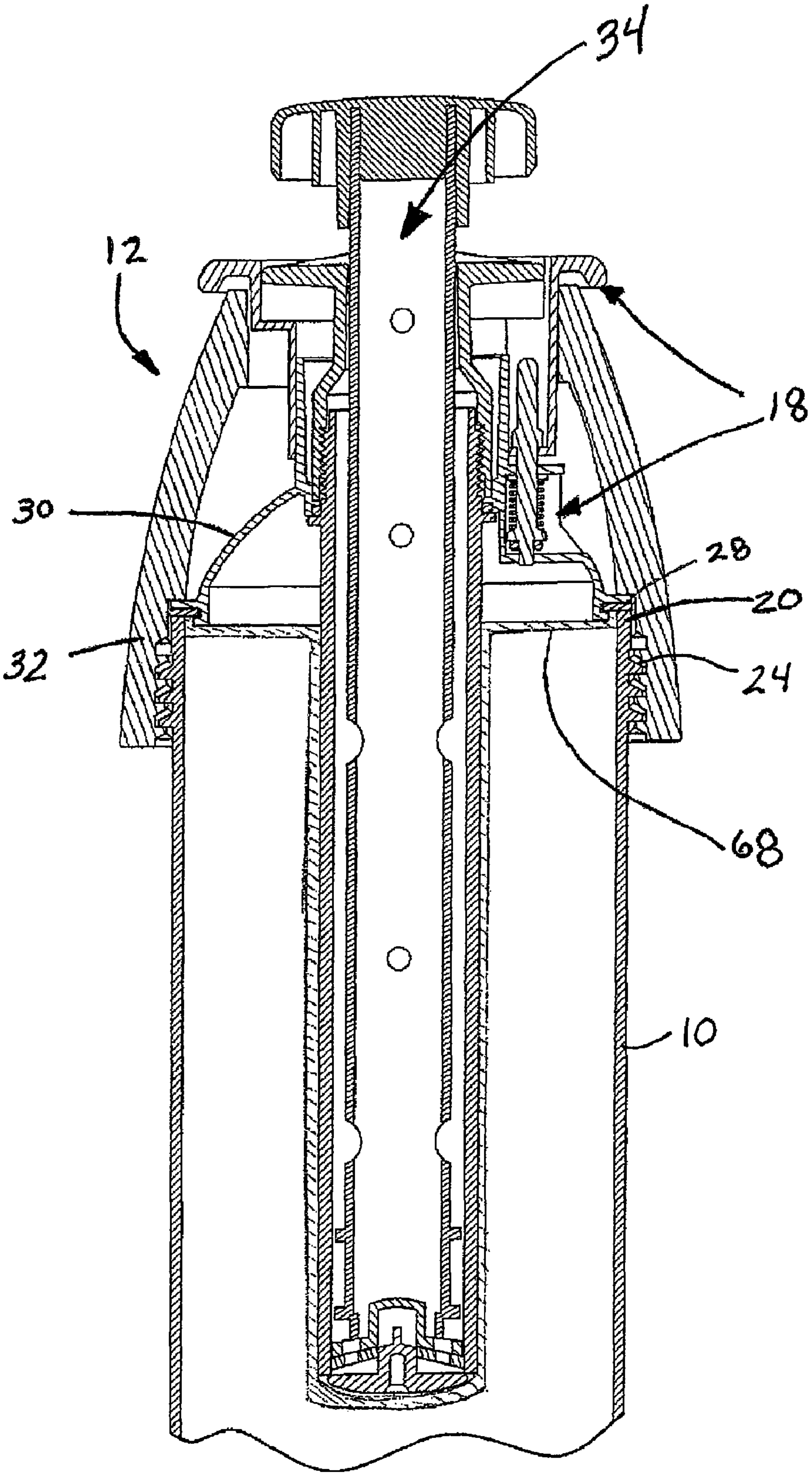
FIG. 5 is a cross-section view of the container and closure shown in FIG. 2.

With reference now to the embodiment illustrated in FIGS. 2-6, the dispensing assembly of some embodiments includes a container 10, a closure 12, a pressurizing means 34, and a bladder or diaphragm 68, as best illustrated in FIG. 5. As mentioned above and explained in greater detail below, the bladder 68 separates the dispensable fluid from the pressurizing fluid. The pressurizing fluid pushes against one side of the bladder 68, which in turn applies pressure to the dispensable fluid. The use of the bladder 68 (along with pressure from a pressurizing means) keeps the dispensable fluid in fluid communication with the dispensing valve 26 in the container 10 even when the container is inverted.

Figure 2:
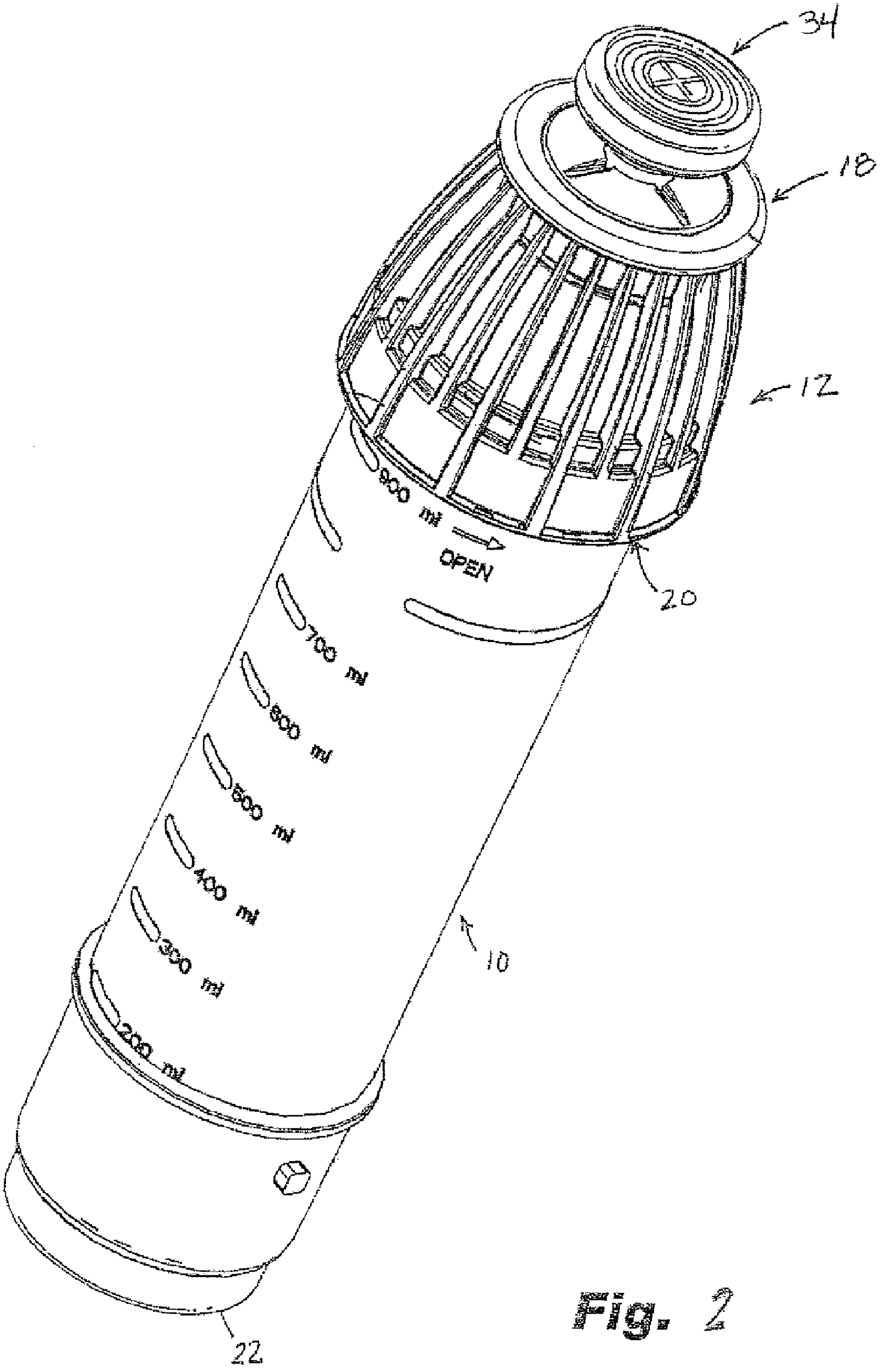
FIG. 2 is a top perspective view of a container coupled to a closure embodying aspects of the present invention.

With reference to FIGS. 2-4, the container 10 and closure 12 of this embodiment is adapted to maintain, pressurize, and deliver a pressurized cleaning or treating solution in substantially any orientation. Preferably the closure forms a selectively sealable engagement with the container.

As illustrated, the container 10 is a generally cylindrical body having a top 20 and bottom 22 (in the illustrated orientation of FIG. 4). The top 20 is provided with threads 24 to allow the closure 12 to engage the container 10. The bottom 22 includes a wall or surface having a having a selectively actuated valve 26 to allow a fluid stored within the container 10 to be dispensed from the container 10. Specifically, in some embodiments, a spigot will enter an opening in the bottom of the bottle 10 to actuate the valve 26, which may include a spring actuated ball bearing.

As best shown in FIG. 5, the closure of this embodiment includes a seal 28, a cap member 30, a threaded cap retainer or overcap 32, a pump assembly 34, and a vent assembly 18. Specifically, the seal 28 is coupled to the cap member 30 and the cap member 30 is coupled to the threaded cap retainer 32 in such a manner that the cap member 30 is independently rotatable with respect to the retainer 32. In other words, the cap member 30 can remain stationary (i.e. not rotate) while the retainer 32 is threaded onto the container 10. As illustrated, the seal 28, cap member 30, and the threaded cap retainer 32 operate similar to a mason jar. The vent assembly 18 and the pump assembly 34 are coupled to and supported on the cap member 30. Additional information regarding the construction of the illustrated closure can be found in PCT Publication No. WO 2008/005841, dated Jan. 10, 2008, which is hereby incorporated by reference. However, before describing the invention further, it should be understood that the seal 28 in some embodiments is not necessary. Rather, the bladder 68 can also serve the same purpose as the seal in some embodiments. As such, the bladder 68 can be a component of the closure 12. However, in some embodiments, the bladder 68 is not necessarily a component of the closure 12.

Figure 6:
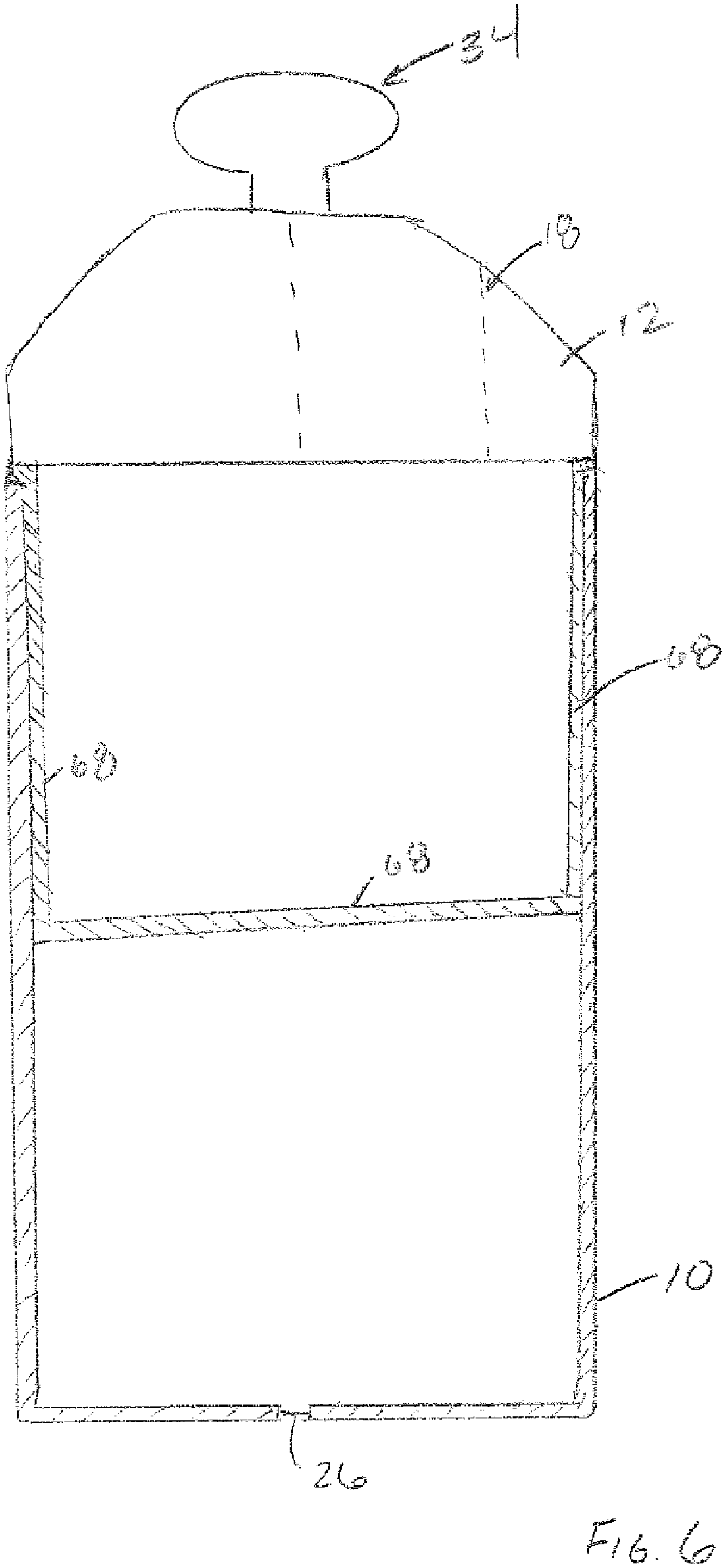
FIG. 6 is a schematic illustration of the container shown in FIG. 6, wherein the bladder is pressurized.

As illustrated in FIG. 5, a bladder 68 extends across the opening of the container 10 and is held in place by the closure 12. Specifically, in this embodiment, the closure compresses the bladder 68 against the container 10. As such, in some embodiments, the bladder 68 can be used as sealing member between the closure and the container. In other words, in some embodiments, the seal used between the closure and the container can be replaced with the bladder. As this illustrated bladder 68 is situated, it separates the pump assembly 34 from the dispensable fluid contained within the container 14. As the pump assembly 34 is actuated to pressurize the container, gas, such as air, is forced into the volume defined by the bladder and the closure assembly. As more gas is forced into this volume, the bladder expands, to allow the gas to occupy more volume within the container. As the volume of air increases, the bladder continues to expand and apply pressure to the dispensable fluid contained the container. As schematically illustrated in FIG. 6, the bladder can deform and fill a substantial volume of the container. In operation, the pressure can be removed by actuating the vent assembly 18 as shown in FIG. 5.

Figure 7:
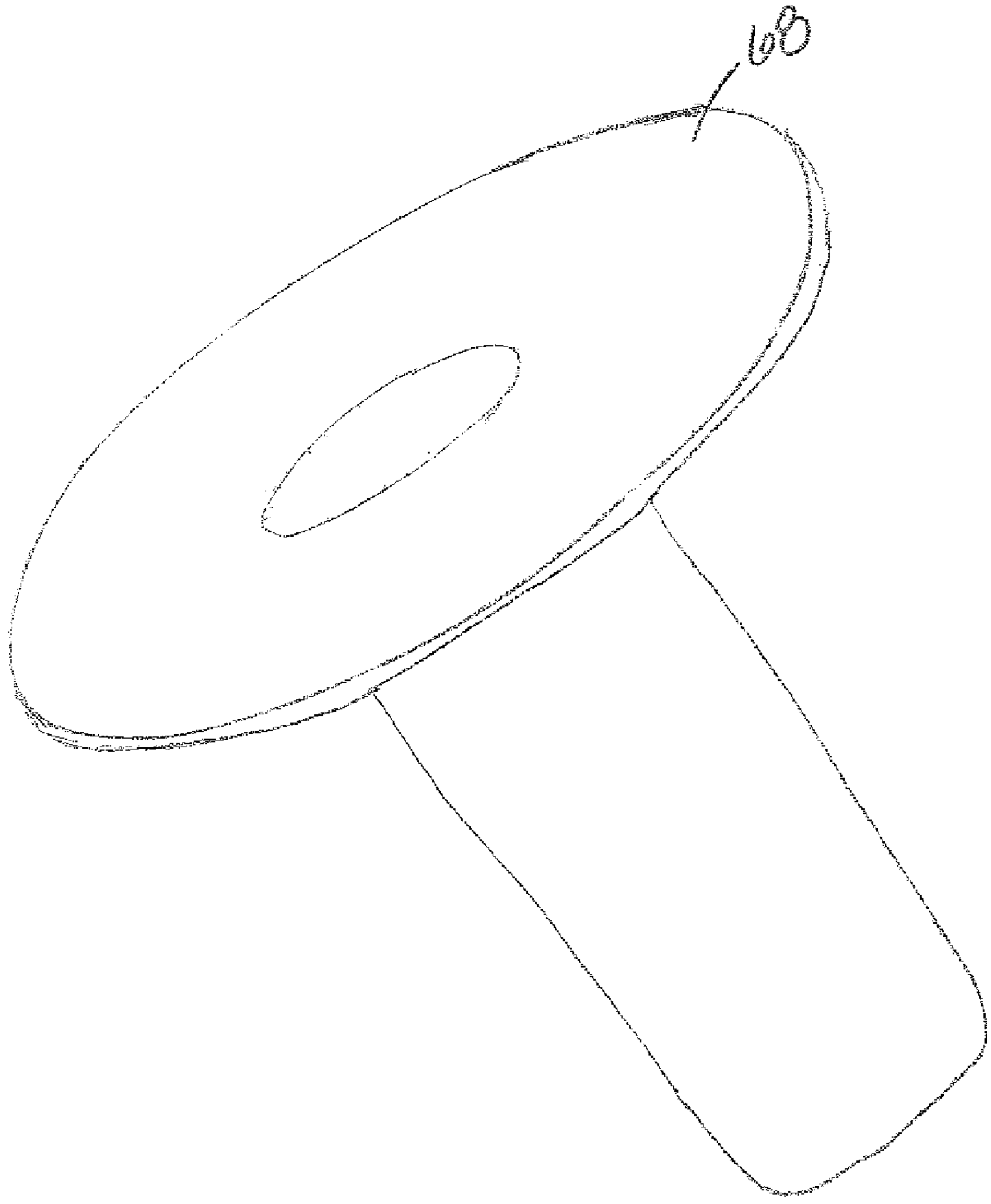
FIG. 7 is a perspective illustration of an exemplary bladder.

FIG. 7 illustrates one particular embodiment of a bladder 68. The bladder 68 is preferably an elastic member that separates the dispensable fluid within the container from the pressurizing fluid within the container. As illustrated, this bladder has a generally cylindrical shape with a flanged top. This configuration is utilized in the illustrated embodiment because of the shape and configuration of the container and pressurizing means. Specifically, the flanged top is generally circular to engage the circumference of the container opening. The center of the bladder has a deep drawn cylindrical shape because of the shape and configuration of the piston pump utilized in the illustrated embodiment. Specifically, the cylindrical portion of the bladder allows the cylindrical body of the piston pump to nest within the bladder.

The bladder can be configured and coupled to the container many different ways. Specifically, the shape and configuration of the bladder can be different depending upon the shape and configuration of the container, closure, and/or pressurizing means. For example, in some embodiments, the bladder can be a disc shaped member that rests across the opening of the container. In other embodiments, the bladder is a deformable bag-like member or balloon-like member. As illustrated in FIGS. 5 and 6, the bladder can be positioned over the opening of the container and extend into the container. However, in other embodiments, the bladder does not have to be positioned over the opening of the container. For example, the bladder can be recessed into the container and rest upon a shoulder located internally within the container. Alternatively, the bladder does not need to extend across the entire cross-sectional area (e.g., circular cross-section of illustrated embodiment) of the container. Rather, the bladder can include a flexible member, such as a bag or other container, such as a balloon, that extends into the volume of the container 10 as is it being filled with a pressurized fluid. The bladder can be made from many different materials, such as rubber or other elastic materials.

Operation of the embodiment illustrated in FIGS. 2-6 will now be described. The container 10 is filled with a liquid, such as a floor cleaning solution and the closure 12 is applied to the container to seal the container 10 for pressurization via the pump assembly 34. However, before the closure 12 is coupled to the container 10, the bladder 68 is inserted into the container 10. In some embodiments, the bladder is coupled to the closure 12 and inserted with the closure 12. For example, the bladder can be integral with the closure. Alternatively, the bladder 68 can be applied to the closure 12 prior to the closure being coupled to the container. In other embodiments, the bladder 68 is separately inserted into the container 10 and rests against the opening of the container 10.

The closure 12 is placed in threaded engagement with the container 10 and the overcap 32 is rotated to place the cap 30 and sealing member 28 in sealing engagement with the top of the container 10. As the overcap or cap retainer 32 is threaded onto the container 10, the cap 30 generally will not rotate with respect to the overcap 32. Specifically, once the overcap 32 is threaded far enough onto the container 10, the sealing member 28 (if utilized), bladder 68, and cap member 30 will begin to engage the top of the container 10, and will be compressed into a sealing, fluid tight engagement by the overcap 32.

Once the container 10 is sealed, the container 10 can be pressurized via the pump assembly 34. A handle on the piston of the pump can be grasped and actuated axially in a reciprocal motion relative to the closure to force air into the second portion of the container (defined by the bladder) via an opening (one-way valve) in the cylinder. As the second portion of the container is pressurized, the bladder can expand a push against the dispensable fluid to pressurize the fluid. In some embodiments, a secondary vent may be desirable to vent any gases contained within the first portion 10A of the container, such that the bladder 68 can contact the dispensable fluid in all orientations.

Once the container 10 is pressurized, the dispensable liquid can be selectively dispensed under pressure from the container via the valve 26 in the container due to the pressure exerted on the fluid via the bladder. In one particular use, the container can be coupled to a mop for dispensing onto a floor.

Whether or not the container 10 is empty, the pressure within the container can be relieved via the vent assembly 18. The vent 18 can be actuated automatically, such as when the pressure within the second portion of the container is too great, or the vent can be actuated manually. For details regarding the actuation of this particular vent assembly, see PCT Publication No. WO 2008/005841, dated Jan. 10, 2008, which is hereby incorporated by reference.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

Various features of the invention are set forth in the following claims.

What is claimed is:

1. A portable dispensing assembly for dispensing a liquid under pressure while the container is positioned in any orientation, the dispensing assembly comprising:

a container having a first portion adapted to house dispensable liquid in the container, and a second portion to house a pressurizing fluid;

a valve coupled to the container and in fluid communication with the first portion, the valve selectively actuatable to dispense fluid from the container under pressure;

a pressurizing source coupled to the container and adapted to provide pressurizing fluid to the second portion of the container;

an elastic bladder coupled to the container separating the first portion from the second portion; and a closure selectively coupled to the container, the closure separable from the container to allow dispensable liquid to be added to the container, the closure including a cap member enclosing an end of the container and a cap retainer disposed over and enclosing the cap member, the cap member located between the cap retainer and the bladder and coupled to the cap retainer such that the cap member remains stationary while the cap retainer is tightened onto the container.

2. The portable dispensing assembly of claim 1, wherein the pressuring source is a pump coupled to the container.

3. The portable dispensing assembly of claim 1, wherein the bladder is positioned immediately adjacent the closure.

4. The portable dispensing assembly of claim 1, wherein the bladder is coupled to the closure.

5. The portable dispensing assembly of claim 1, wherein the pressurizing source is a pump and the pump is coupled to the closure.

6. The portable dispensing assembly of claim 5, wherein the bladder is positioned adjacent the pump.

7. The portable dispensing assembly of claim 1, wherein the bladder is positioned between the closure and the container to form a fluid tight seal between the closure and the container.

8. A dispensing assembly adapted to dispense a dispensable fluid under pressure, the dispensing assembly comprising:

a container having a first opening adapted to receive dispensable fluid in to the container and a second opening adapted to selectively dispense the dispensable fluid from the container; and a closure receivable on the first opening of the container in a fluid tight manner via a threaded connection and adapted to allow dispensable liquid to be added to the container, the closure comprising:

a bladder adapted to engage and selectively seal an interface between the first opening of the container and the closure;

a seal;

a cap coupled to the seal; and a retainer coupled to the cap and selectively engageable with the first opening of the container via a threaded connection, the retainer disposed over and enclosing the cap and coupling the cap and seal to the first opening of the container, the cap located between the retainer and the seal, and the cap and seal are independently rotatable with respect to the retainer during compression of the seal between the cap and the first opening by the retainer.

* * * * *

UNITED STATES PATENT AND TRADEMARK OFFICE

CERTIFICATE OF CORRECTION

PATENT NO. : 8,353,430 B2
APPLICATION NO. : 12/665314
DATED : January 15, 2013
INVENTOR(S) : Jim J. Hilarides It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 301 days.

Signed and Sealed this
First Day of September, 2015

Michelle K. Lee

Michelle K. Lee
*Director of the United States Patent and Trademark Office*